United States Patent [19]

Lindsey

[11] Patent Number: 4,616,104

[45] Date of Patent: Oct. 7, 1986

[54] FIRE RESISTANT ELECTRICAL JUNCTION BOXES

[76] Inventor: Travis C. Lindsey, 7177 Enterprise Dr., Las Vegas, Nev. 89117

[21] Appl. No.: 672,086

[22] Filed: Nov. 16, 1984

[51] Int. Cl.$^4$ .............................................. H02G 3/08
[52] U.S. Cl. ..................................... 174/48; 174/65 R
[58] Field of Search ................... 174/48, 53, 58, 65 R; 220/3.3, 3.4, 3.5, 3.9, 88 R, 3.92, 3.94

[56] References Cited

U.S. PATENT DOCUMENTS

| | | | |
|---|---|---|---|
| 1,814,449 | 7/1931 | Morgenstern | 220/3.9 |
| 2,875,915 | 3/1959 | Buckels | 220/3.92 X |
| 3,995,102 | 11/1976 | Kohaut | 174/48 |
| 4,087,624 | 5/1978 | Hitchcock | 174/57 |
| 4,158,420 | 6/1979 | Balkwill et al. | 220/3.3 |
| 4,413,683 | 11/1983 | Hune | 220/88 R X |

FOREIGN PATENT DOCUMENTS 2806374 8/1979 Fed. Rep. of Germany ........ 174/48

Primary Examiner—Arthur T. Grimley
Assistant Examiner—D. A. Tone
Attorney, Agent, or Firm—Seiler, Quirk & Tratos

[57] ABSTRACT

An electrical box designed to minimize the potential for sound, smoke or fire traveling therethrough when wall-mounted and has an interior rigid housing and a molded non-combustible exterior casing. The casing is a unitary, single-piece sheathing, having openings only for attachment of line conduit. A tubular collar portion extends outwardly from the front opening of the box, and is easily cut or machined to conform to the adjacent wall surface.

16 Claims, 3 Drawing Figures

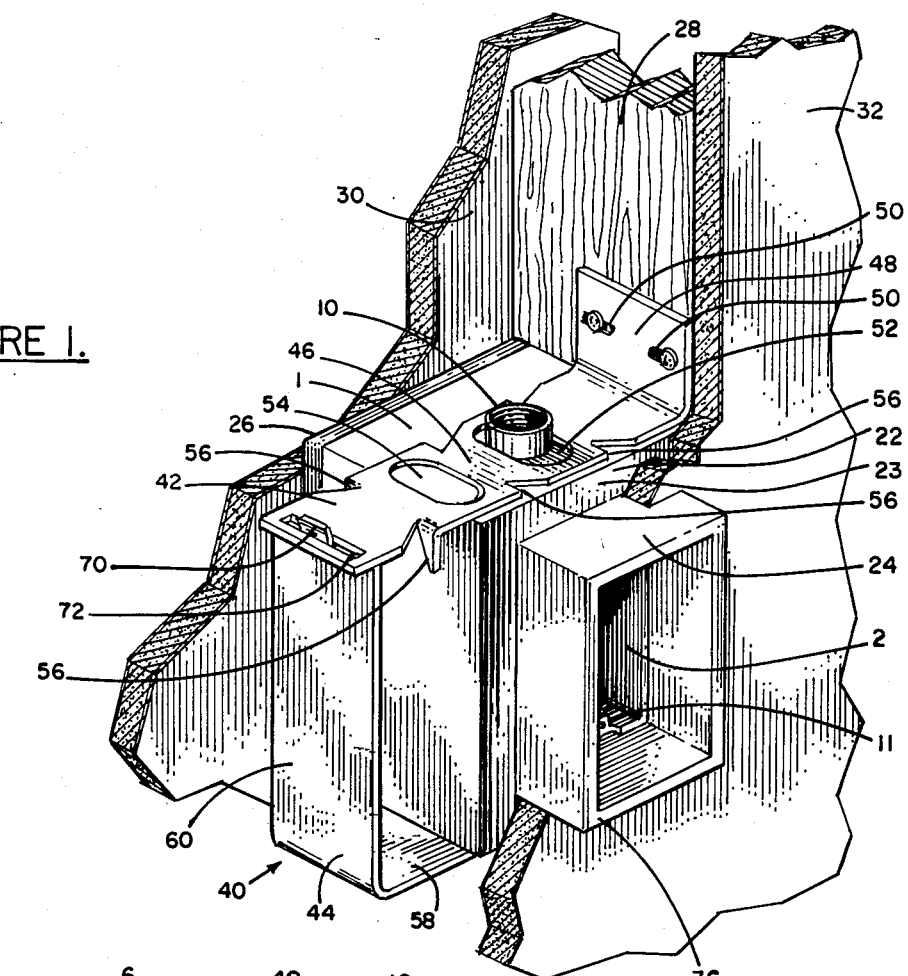

FIRE RESISTANT ELECTRICAL JUNCTION BOXES

BACKGROUND OF THE INVENTION

This invention relates to electrical boxes, such as outlet or junction boxes, which are used in commercial or residential buildings. More particularly, the invention relates to electrical boxes having a molded non-combustible exterior which precludes the passage of fire and minimizes sound transmission.

The risk of the passage of fire through a wall from one interior space of a building to another through electrical junction boxes is not readily apparent to a layman but is well known to those in the business of fire safety. In many cases, a firefighter's ability to extinguish a fire with minimal damage may depend upon the ability to contain the fire within a relatively small space. While walls may be made of fire resistant material, a rampaging fire may escape through holes in the ceiling or walls frequently used to house electrical boxes. Once the fire penetrates the walls, it may travel rapidly through spaces between the walls into attic or crawl space areas, spreading rapidly. Accordingly, the ability to confine a fire to a single room may depend upon the ability to preclude its travel through electrical fixtures.

Unfortunately, the ability to impede travel of a fire through electrical boxes is often elusive. For example, in the installation of electrical boxes in walls and ceilings, the proper frontal alignment of the face plate of the box is difficult since deformities (knots, splits, checks, or holes) may exist in the framing members to which the box is attached. To compensate for these deformities, it is common to tilt the box at an angle in the wall, resulting in an improper seal around the opening of the box. In addition, the attachment of the box to the wall is frequently not secure. Thus, in the process of fighting the fire, the impact of a water stream from a hose on the electrical box may deform the box, allowing the fire to proceed through the wall.

Another installation problem relates to the use of veneer on walls or floors with various types of tile, brick, paneling, or similar materials. Where these veneers are of uneven thickness, deformities exist around the opening of the outlet which leave cracks and frequently cause warpage of the outlet coverage even causing breakage of these covers. In addition, it is frequently necessary to position the electrical outlet in the wall taking into account the thickness of the wall treatment that will ultimately be mounted on the wall. If the box is mispositioned in the wall such that the face of the box protrudes through the surface of the wall sheathing, either the sheathing may have to be removed and the box repositioned, or a metal spacer may be placed around the wall opening in order to extend the wall surface to the proper installation depth to permit the electrical box cover to compress snugly against the wall face. Boxes installed in this manner may be easily dislodged or broken in the event of a blow or impact on the face of the box.

Another typical danger is caused by the over-tightening of mounting screws for ceiling-mounted lamps, causing the electrical box in the ceiling to become tilted. This may cause weakening of the mounting bracket, or even extraction of the nails holding the box to the framing members, destroying any caulking used to seal the box and attenuate sound.

In addition to fire resistance in apartment, hotel, condominium, and similar buildings, it is desirable to provide as much sound resistance as possible between the various dwelling units to protect the privacy of its occupants. Regardless of thickness of wallboard or quantity of insulation between the walls, sound will travel through the openings made in walls for electrical outlet boxes, particularly through small cracks or holes in the conventional electrical boxes that are used in the construction of these facilities.

The present invention provides an electrical box having a conventional interior housing and a relatively thick, integral (one piece) sheathing molded to the housing and fabricated from a fire resistive material such as mica, silica, plaster of paris, or fiberglass, or various intumescent paints and materials. The entire unit is factory produced and presealed, with no cracks or holes existing in the unit. A pair of conduits extend through walls in the box in order to enable passage of electrical conduit into and out from the box. A collar portion of the sheathing extends outwardly from the front of the box, and is easily machined or otherwise cut away to conform to the wall surface. A special mounting bracket which may accommodate outlets of different sizes or different mounting techniques is also provided. In a preferred embodiment, the unit is provided with a relatively dense foam backing which is used to absorb impact to the face of the box. The electrical boxes of the invention make it virtually impossible for a fire to pass through the box and into another room of a building, and also permit easy adjustment of the box to fit a wall and wall veneer of virtually any thickness.

Various methods have been tried in the past for increasing the fire resistivity of electrical junction boxes. For example, in Moll, U.S. Pat. No. 3,720,783, a cover member is provided for a junction box which forms a tubular collar which can be broken away along a series of lines of weakness in order to conform the front of the junction box with the wall surface. This collar is simply attached mechanically to the front of the electrical box. A similar collar attachment is shown in Hitchcock, U.S. Pat. No. 4,087,624, where a collar of adjustable size is attached to the junction box. In addition, it is known to insulate the interior of various housings with a fire-resistant coating, such as asbestos, as is shown in Cole, U.S. Pat. No. 3,646,244, Palmer, U.S. Pat. No. 4,307,813, and Hune, U.S. Pat. No. 4,413,683.

Accordingly, it is an object of the present invention to provide a factory-manufactured electrical box having an integrally molded fireproof sheathing. It is yet another object of the invention to provide an electrical box having a one-piece molded exterior having a front tubular collar which is easily cut to conform to a wall surface. It is yet another object of the invention to provide a molded electrical box in combination with a mounting bracket adapted to mate with the components of the electrical box, which bracket serves to rigidly mount the electrical box in a wall while permitting slight variations in the attitude of mounting the box. It is yet a further object of the invention to provide an electrical box which minimizes the potential for transport of fire and sound through the box or the opening in the wall cut for the box. These and other objects of the invention will be obvious from the following description of a preferred embodiment thereof.

BRIEF SUMMARY OF THE INVENTION

A fire resistant electrical box comprises a housing having a rigid enclosure formed by walls, and a non-combustible sheath molded to the exterior housing walls having a body portion coextensive with said walls and a collar portion extending forwardly from the body portion. A pair of threaded conduits extend through the walls of the box and the sheath, permitting the passage of electrical conduits into the box. The collar portion of the sheath, while rigid, may be easily cut with a knife or machined with a sander to permit the face of the electrical box to conform with the adjacent wall surface. A mounting bracket for the electrical box fits over the top and bottom walls of the box, and has apertures adapted to receive the conduits extending through the box walls.

BRIEF DESCRIPTION OF THE DRAWINGS

The invention is best understood with reference to the drawings, in which:

FIG. 1 is a perspective view, partially cut away, of an electrical box of the invention mounted in a wall with a mounting bracket of the invention;

FIG. 2 is a side section view thereof; and

DETAILED DESCRIPTION OF A PREFERRED EMBODIMENT

Figure 3:
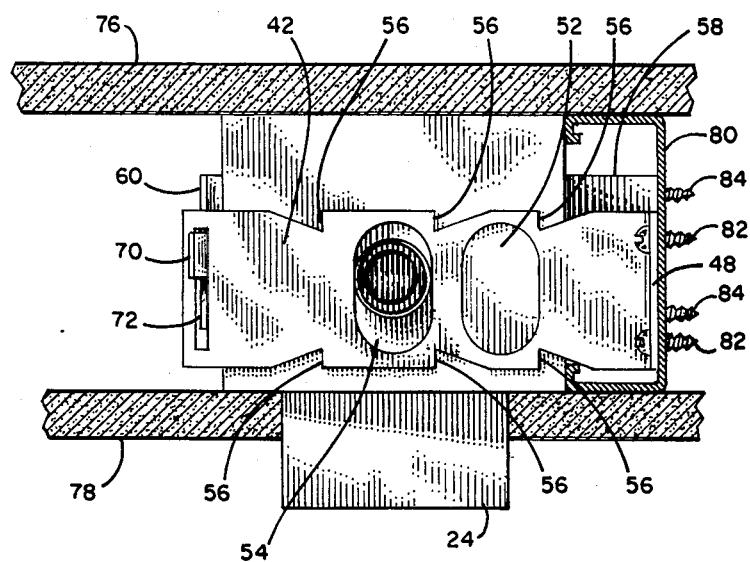
FIG. 3 is a top view of the combination of the electrical box and mounting bracket of the invention mounted in a wall on a metal stud.

Fire resistant junction box 1 is fabricated from a conventional metal (e.g., steel or aluminum) electrical outlet box 2 and a relatively thick, external molded fire resistant casing or sheath 22. The metal electrical box is shown as rectangular, but may be square, octagonal, round, or any other conventional shape. As best seen in FIG. 2, the box has rear wall 4, top wall 6, and bottom wall 8. The front of the box is open, although conventional face plate mounting flanges 9 and 11 containing centrally located holes for receiving face plate screws project inwardly from the top and bottom walls. An internally-threaded female pipe coupling 10 is fastened to a rearward portion of the top wall by means of a standard threaded chase nipple 12. These connection members permit conduit to be attached to the box without any possibility of fire escaping through cracks in the coupling. The flange 14 of the chase nipple abuts the interior top wall of the box, thus forming a compressive fit with the connector 10. A similar arrangement exists at the lower portion of the box, with threaded female coupling 16 being attached to bottom wall 8 by flange 20 of metal chase nipple 18. Wiring and cable may be easily inserted into the box through these coupling members, which permit communication into the interior of the box through the upper and lower walls.

A very important feature of the invention involves the molded exterior fire-proofing material which is factory-fabricated to be immediately adjacent to the exterior surface of the box. The exterior casing ranges from $\frac{1}{4}''$ to 2'' thick and is fabricated from a fire resistant, non-combustible material such as calcinated gypsum, mica, silica, fiberglass, perlite, Vermiculite, RTV foam, high alumina cement, and intumescent paint such as 3M Fire-Stop sealant. A typical example of a preferred composition is 15–25% masonry cement, 15–25% plaster, 15–25% perlite, (all by weight) with the balance being water, or the like. Refractory materials are preferred. The important characteristics of the coating material is that it be entirely uniform (i.e., a single piece structure free from cracks or lines of structural weakness) and moldable so as to fit snugly to the exterior surface of the electrical box. The casing desirably has a compressive strength from 300–1,000 psi, and a density of from 30–140 lbs/cu.ft., and a thermal conductivity of about 2–5 BTU/in. at 150° C.

The casing 22 has a body portion 23 which immediately surrounds the walls of the electrical box and the conduit means extending outwardly from the box, and a collar portion 24 which conforms to and extends forwardly from the front opening of the box. The fire resistant sheathing is relatively thick around the box itself, ranging from $\frac{1}{2}$–2'', and is preferably 1–1$\frac{1}{2}$'' thick. The particular thickness of the insulating casing will depend on the degree of fire resistivity, strength and level of sound insulation desired for any particular installation. The collar portion is somewhat less thick, and is generally $\frac{1}{4}$–$\frac{3}{4}''$ thick.

As shown in the drawings, the junction box of the invention is fabricated from a sheet-metal enclosed housing. It is contemplated to provide a junction box which is entirely a single-piece molded unit, with the material of construction being of sufficient strength to enable elimination of the sheet-metal interior. In such case, the openings in the casing walls may be molded with threads, thus permitting connection of the wiring conduit directly into the box.

A rubber protective backing 26 is adhesively mounted to the rear wall of the box and is generally coextensive therewith. The backing is fabricated from a generally dense foam silicone rubber, such as Dow Corning RTV Foam, and is to prevent damage to the electrical box in the event that strong pressure or a blow is applied to the front plate thereof. For example, a person attempting to jam a bent plug into the box would have the blow cushioned by the foam rubber backing. The foam backing is optional, and some embodiments of the sheathed boxes of the invention extend through the entire width of the void space between the wall members. For example, the unit shown in FIG. 3 does not have a foam backing.

FIGS. 1 and 2 show units of the invention mounted in the void space between walls fabricated from wooden studs and drywall. The unit is mounted by means of a bracket to a conventional wooden stud 28 and is mounted between a rear drywall panel 30 and front drywall panel 32. In FIG. 2, an additional front drywall panel 34 is shown to provide additional fire resistance for the wall. A particular advantage of the invention is that the material from which the sheathing is fabricated, while rigid, is easily machined with a sander or pocket knife, enabling the collar to be cut to conform to the wall surface in which it is mounted. For example, an installer could easily cut back the front surface 36 of the collar to be flush with the drywall surface. This is particularly advantageous if the wall covering is not flat, or is rough textured as with brick or tile. The formability of the collar enables the unit to mount flush with any type of surface. While the machinability of the casing material is difficult to define within precise boundaries, it should be workable with common hand tools such as saws, knives, files, or sanders; for example, it should be machined or cut with approximately the same facility as standard wallboard.

The electrical box of the invention is mounted in a wall by means of a special two-piece bracket 40. The bracket is fabricated from a top bracket member 42 and a corresponding bottom member 44. Top member 42 has a flat strap portion 46 which extends along the top of the box and which has an upwardly extending mounting flange 48 oriented perpendicularly to the strap portion. Oblong slots 50 in the mounting flange are adapted to receive screws or nails for mounting the bracket member to a vertical stud. A pair of oblong openings 52 and 54 are located in a central portion of the top bracket member to receive the conduit connector 10.

A series of three spikes 56 are located along each edge of the top bracket member to insert into the casing material to hold the box in proper orientation. The spikes are formed by making slanted cuts along the edge of the bracket member, and by bending a spike downwardly perpendicular to the bracket member. The bottom bracket member 44 has a bottom support strap portion 58 and a vertical end portion 60. A pair of oblong holes exist in the bottom strap and are similar to and are aligned with oblong holes 52 and 54 in the top strap. These holes have a similar function of permitting passage of the conduit connector 16 of the box; one of the oblong holes 62 is seen in FIG. 2. Similarly, a vertical mounting flange 66 extends downwardly from the end of the strap portion of the bottom bracket member. Elongate nail slots 68 are used to mount the bottom portion of the bracket to a stud. The two bracket members engage by the extension of tongue or tab 70 at the upper end of the lower bracket member 44 extending through an elongate transverse slot 72 at the end of upper bracket member 42. As can readily be seen from FIG. 1 and FIG. 3, the size and shape of the oblong holes 54 and 52, and the ability of the locking tab 70 to slide within slot 72, permit the lateral adjustment of the bracket members relative to each other, and also permit some lateral movement of the electrical box with respect to the bracket. However, no latitude exists for vertical movement of the box in the bracket.

FIG. 3 shows an electrical box of the invention mounted between drywall panels 76 and 78. The electrical box is shown without foam backing, and fills the entire width of the void space between the drywall panels. The box is mounted to a standard metal stud 80, requiring the conduit member to extend through oblong opening 54 rather than opening 52 as is shown in FIGS. 1 and 2. In addition, the top and bottom mounting flanges are offset with respect to each other, with the top bracket member being mounted more forwardly than the bottom bracket member. The upper bracket member is fastened to the metal stud by means of mounting screws 82, while the lower bracket member is correspondingly fastened by means of mounting screws 84. Accordingly, the same bracket may be used to fix the electrical box in an immovable position while permitting adjustment laterally to adapt the location of the box at the desired distance from the stud.

While obviously variations may exist in the particular size and design of the bracket members depending on the various outlet shapes and sizes, an appropriate bracket may be fabricated from $\frac{1}{8}''$ steel strap about $2\frac{1}{8}''$ wide. The length of the strap will of course depend upon the size of the outlet box and whether the device is installed on a wood, sheet metal, or steel stud. However, the typical bracket for a single device is approximately $6\frac{1}{2}''$ long. The spikes 56 are approximately $\frac{1}{4}''$ wide at the widest point and approximately $\frac{1}{2}''$ long.

For simplicity, the electrical box of the invention is shown in the drawings without a cover plate. It is of course conventional to attach a cover plate, which is a standard decorative plastic cover, to the front of the electrical box.

The molded exterior sheathing of the electrical box is absolutely critical to the design of the invention. The exterior casing may be molded in any known manner; in addition, while the interior electrical box is shown as being made from sheet metal, it may also be a portion of the molded casing. The important concept of the electrical boxes of the invention is the existence of a single-piece, unitary molded casing structure which has sufficient structural stability and rigidity to mount electrical components in a wall, which has sufficient sound and fire resistivity, and which is molded tightly to the interior construction so as to preclude travel of fire or sound through the unit. In addition, the other important characteristic is a molded collar extending forwardly from the body which is easily cut with a machine or pocket knife to conform to the wall surface. Within the scope of the invention, a number of modifications and variations may be made which would be obvious to those skilled in the art. Accordingly, the invention should not be considered limited by the disclosure of the specific embodiment, but rather should be limited only by the following claims.

I claim:

1. A fire-resistant electrical box comprising
 a rigid housing having fire-resistant walls, said housing having a first opening adapted to be enclosed by means of a cover plate,
 a one-piece, non-combustible casing enclosing the exterior housing walls and having a body portion completely surrounding said walls,
 said casing also having a collar portion integrally molded with the casing extending forwardly around the entire periphery of the front opening, said collar portion having a thickness at least $\frac{1}{4}''$, and
 conduit means extending from the interior of the box through a housing wall and the casing for enclosing electrical wiring.

2. The electrical box of claim 1 wherein the housing is fabricated from rigid sheet metal.

3. The electrical box of claim 1 wherein the casing is fabricated from a molded refractory material.

4. The electrical box of claim 1 wherein the casing is from $\frac{1}{2}''$–$2''$ in thickness.

5. The electrical box of claim 1 wherein the body portion has a thickness of $\frac{1}{2}''$–$2''$, and the collar portion has a thickness of $\frac{1}{4}''$–$\frac{3}{4}''$.

6. The electrical box of claim 1 wherein the casing is fabricated from a material having a compressive strength of about 30–140 psi, a density of about 30–140 lbs/cu.ft., and a thermal conductivity of about 2–5 BTU/in. at 150° C.

7. The electrical box of claim 1 wherein the casing is fabricated from a material which is easily machined with common hand tools.

8. The electrical box of claim 7 wherein the material has a machinability similar to wallboard.

9. The electrical box of claim 1 wherein the casing is fabricated from the group consisting of gypsum, mica, silica, fiber glass, perlite, vermiculite, or high alumina cement, or a combination thereof.

10. The electrical box of claim 1 wherein the casing is fabricated from a substantially rigid, dense foamed material.

11. The electrical box of claim 1 wherein the casing is fabricated from an intumescent material.

12. The electrical box of claim 1 wherein the casing in fabricated from a mixture comprising masonry cement, plaster, and perlite.

13. In combination, an electrical box comprising a rigid housing having fire-resistant walls, said housing having a first opening adapted to be enclosed by means of a cover plate, a one-piece, non-combustible casing enclosing the exterior housing walls and having a body portion completely surrounding said walls, said casing also having a collar portion extending forwardly from the front opening, and conduit means extending from the interior of the box through a housing wall and the casing for enclosing electrical wiring, and a mounting bracket having an upper member adapted to transverse a top wall of the casing, said upper member having an opening to receive a conduit therethrough, a lower bracket member adapted to traverse a bottom wall of the box, said lower member having an opening therein to receive a conduit therethrough, a plurality of teeth extending downwardly into the top wall of the casing, fastening means for releasably interconnecting the upper and lower members, and attachment means for affixing the bracket to a vertical support member.

14. The combination of claim 13 wherein the fastening means comprises a transverse slot in the upper member and a tab member on the lower member adapted to insert through the slot.

15. The combination of claim 13 wherein the upper member comprises a flat sheet-metal strap, and the lower member comprises a flat horizontal portion adapted to support the electrical box and a vertical portion adapted to engage the upper member.

16. The combination of claim 13 also comprising adjustment means to permit lateral relative movement of the upper and lower members to permit a plurality of alignments of said upper and lower members.

* * * * *